United States Patent
Dancau

(10) Patent No.: US 10,010,794 B2
(45) Date of Patent: Jul. 3, 2018

(54) DISPLAY INTERACTION IN A COMPUTER DEVICE

(71) Applicant: KING.COM LIMITED, St. Julians (MT)

(72) Inventor: Andrei Dancau, Bucharest (RO)

(73) Assignee: KING.COM LTD., St. Julians (MT)

( * ) Notice: Subject to any disclaimer, the term of this patent is extended or adjusted under 35 U.S.C. 154(b) by 787 days.

(21) Appl. No.: 14/497,587

(22) Filed: Sep. 26, 2014

(65) Prior Publication Data

US 2015/0174488 A1     Jun. 25, 2015

(30) Foreign Application Priority Data

Sep. 26, 2013   (GB) .................................. 1317148.3

(51) Int. Cl.
*A63F 13/57* (2014.01)
*A63F 13/5372* (2014.01)

(52) U.S. Cl.
CPC .......... *A63F 13/57* (2014.09); *A63F 13/5372* (2014.09)

(58) Field of Classification Search
CPC ...... A63F 13/52; A63F 13/5372; A63F 13/57; A63F 13/822
See application file for complete search history.

(56) References Cited

U.S. PATENT DOCUMENTS

2014/0080561 A1* 3/2014 Knutsson ................ A63F 13/12
                                                                463/10

OTHER PUBLICATIONS

Hexic HD: Setting up the master grid 1/3, by XIJack0IX retrieved from https://www.youtube.com/watch?v=J0qu3bSzWwY, published on Mar. 18, 2009.*
Hexic HD Achievement—Survivalist, by calcatchem, retrieved from https://www.youtube.com/watch?v=3fh8uwapPz4, published on Dec. 4, 2008.*
SFIV's 3D polygons could have ruined hit detection, by Conrad Zimmerman, published on Apr. 26, 2010, retrieved from https://www.destructoid.com/sfiv-s-3d-polygons-could-have-ruined-hit-detection-172084.phtml, using waybackmachine (https://web.archive.org/web/20100501000000*/https://www.destructoid.com/sfiv-s-3d-polygons-could-have-ruined-hit-detection-17.*

* cited by examiner

*Primary Examiner* — Jasson Yoo
(74) *Attorney, Agent, or Firm* — Saul Ewing Arnstein & Lehr LLP

(57) ABSTRACT

Rendering an image of a game board on a display comprising a plurality of tiles and a tumbler object abutting at least one tile; recording in a memory the position of the tumbler object in a physical world; detecting a user input to insert a new tile; detecting if the new tile creates a match with two adjacent existing tiles and if so rendering a new image of the game board on the display wherein the new and two existing tiles are removed; detecting in the physical world if the tile abutting the tumbler object has been removed and if so rendering an image of the tumbler object falling down the display under a simulated gravity imposed by a physics engine; and monitoring the position of the falling tumbler object and on determination that one of its edges abuts another tile, preventing it from falling further.

11 Claims, 26 Drawing Sheets

DISPLAY INTERACTION IN A COMPUTER DEVICE

CROSS-REFERENCE TO RELATED APPLICATIONS

This application claims priority to Great Britain Application No. GB1317148.3, filed Sep. 26, 2013, the entire contents of which is fully incorporated herein by reference.

FIELD OF THE INVENTION

The invention relates to a computer device having a display on which objects are rendered which can interact with one another.

BACKGROUND OF THE INVENTION

One scenario in which objects are rendered on a display wherein their interactions need to be governed is in computer games. There are challenges in rendering realistic and engaging images for a user, while nevertheless allowing the user to interact with the display in a manner which allows game rules associated with the game to be reliably implemented.

SUMMARY OF THE INVENTION

According to one aspect of the present invention there is provided a method of controlling a display of a computer device comprising: rendering an image of a game board on the display, the image comprising a plurality of tiles at corresponding tile locations, and a tumbler object abutting at least one tile; recording the position of the tumbler object whereby its edges are defined in two dimensions in a physical world; detecting a user input to insert at least one new tile at a tile location; detecting if the new tile creates a match with at least two adjacent existing tiles and if so rendering a new image of a game board on the display wherein the new and at least two existing tiles are removed; detecting in the physical world if the at least one tile abutting the tumbler object has been removed and if so rendering an image of the tumbler object falling down the display under a simulated gravity imposed by a physics engine; and monitoring the position of the falling tumbler object and on determination that one of its edges abuts another tile, preventing it from falling further.

Another aspect provides a computer device comprising: a display; a user input element; at least one processor connected to the display and the user input component and arranged to execute computer instructions to implement the method of: rendering an image of a game board on the display, the image comprising a plurality of tiles at corresponding tile locations, and a tumbler object abutting at least one tile; recording the position of the tumbler object whereby its edges are defined in two dimensions in a physical world; detecting a user input to insert at least one new tile at a tile location; detecting if the new tile creates a match with at least two adjacent existing tiles and if so rendering a new image of a game board on the display wherein the new and at least two existing tiles are removed; detecting in the physical world if the at least one tile abutting the tumbler object has been removed and if so rendering an image of the tumbler object falling down the display under a simulated gravity imposed by a physics engine; and monitoring the position of the falling tumbler object and on determination that one of its edges abuts another tile, preventing it from falling further.

In a particularly preferred embodiment, the tumbler object is rendered as a three-dimensional object by a three-dimensional rendering engine. However, the object is treated as a two-dimensional object when controlled by a physics engine in order to govern how the object interacts with tiles in order to ensure that game rules are properly implemented.

This allows a realistic image to be generated for a user, while nevertheless ensuring that game rules are properly adhered to.

Moreover, as the tumbler object can be a different size to the tiles, and is capable of rotating as it falls down, its interaction with the tiles needs to be governed properly. This is achieved by an object position component which detects the position of the tumbler object and accesses a matrix component which records the position and identity of tiles in their respective tile locations. In this way, the behaviour of the tumbler object as determined by the physics engine can be properly managed in a physical world which is created comprising the tiles and the tumbler object.

There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has a social aspect—for example if it is linked to a social network so that game players can interact with their friends within the social network. The game can then transform into something that goes far beyond a solo game experience and becomes more like a shared journey.

'Viralisation' requires a game to include various techniques that encourage players to share the game with others, encouraging others to play the game. It is a key technique 25 in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed once they have reached a certain size. The user can connect the groups with a swiping movement, touching each of the connecting elements in one implementation. In another implementation the groups are formed into one group when elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other 10 protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DETAILED DESCRIPTION OF THE INVENTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
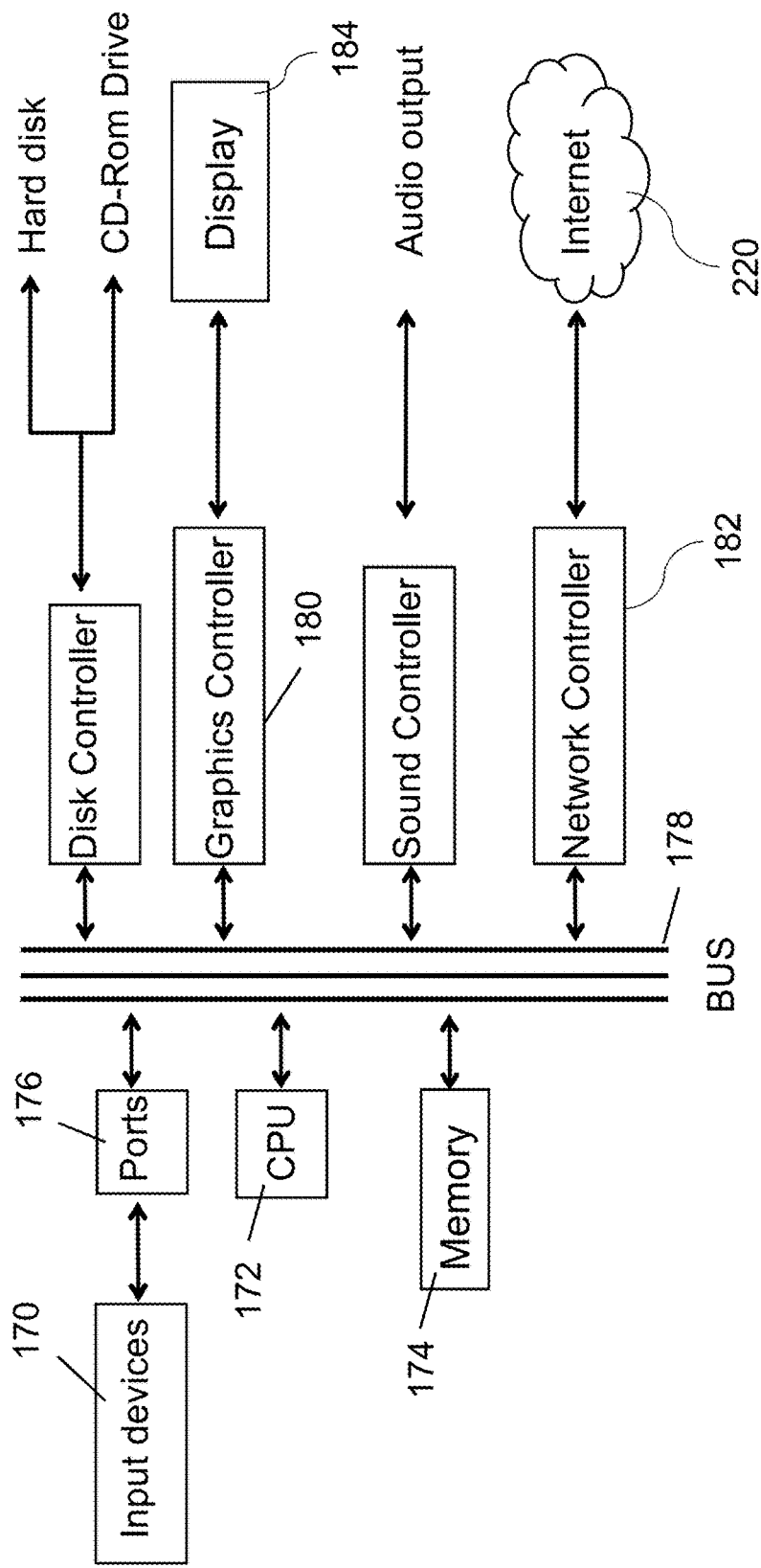
FIG. 1 is a schematic illustration of a computing device.

FIG. 1 shows a schematic picture of a computing device, containing a Central Processing Unit 172 and Random Access Memory 174. The CPU acts according to input given from input devices 170, such as a keyboard, mouse or touchscreen. Computer Buses are used to communicate, both between input devices 170 and the CPU 172, but also between different controllers within the computer device, such as a graphics controller 180 and a network controller 182. These controllers in turn communicate with external devices, such as a display for video output with which the graphics controller communicates, and the network controller 182 communicates with for instance the internet, through wireless or wired connections. A user can interact with the computing device through input devices, such as a pointing device (e.g. a mouse) and a keyboard.

Figure 2:
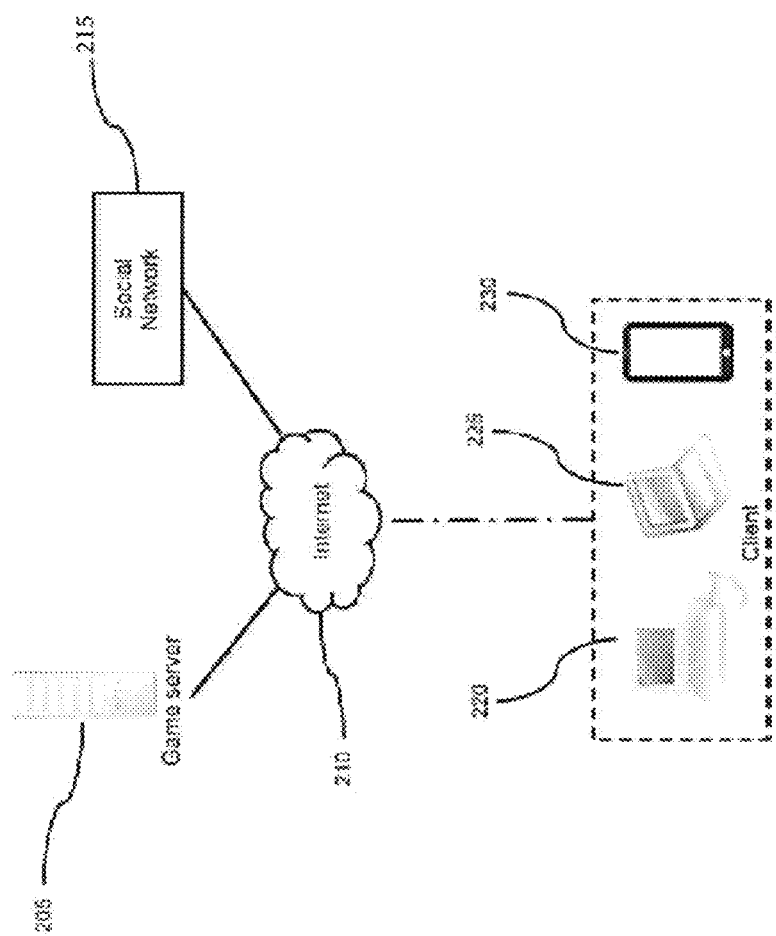
FIG. 2 shows an exemplary environment.

As shown in FIG. 2, the computing device can be a computer terminal (e.g. a desktop 220) or a mobile device such as a smartphone 230, tablet or laptop 225.

FIG. 2 portrays an exemplary overall environment in which the present invention can be utilized. A virtual game is stored on for instance a game server 205. The virtual game is to be played on a client device, such as a computer terminal or a smartphone 230 or other handheld device. The client device can also be a kiosk, arcade gaming station, smart TV or other device with computing capabilities, input devices and a screen that can present the game to a user. The client device communicates with the game server 205 and a social network server 230, for instance through the Internet 220 or other network. It should be understood that the social network server 215 and the game server 205 does not have to be located in different places, they could be on the same server or on a plurality of servers located in different locations. People skilled in the art will understand that other devices than the exemplar}' ones listed can be also be used without departing from the spirit and scope of the invention.

Different Implementations

The techniques described in this patent can be deployed in many different gameplay architectures. For example, a computer game can be implemented as a computer program that is stored in a local memory, e.g. RAM 174 and runs entirely locally on the processor (e.g. CPU 172) of a PC, games console, tablet or mobile telephone or other computing device. The game can be implemented solely as a computer program that is stored in a server memory and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and stored in a memory of the client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Game Overview

The present invention may be implemented as a clicker type of game where the player insert game elements in the form of tiles in to a game board and thereby pushing away the already existing tile. The present game may be described as an "inserter" type of game.

Figure 3:
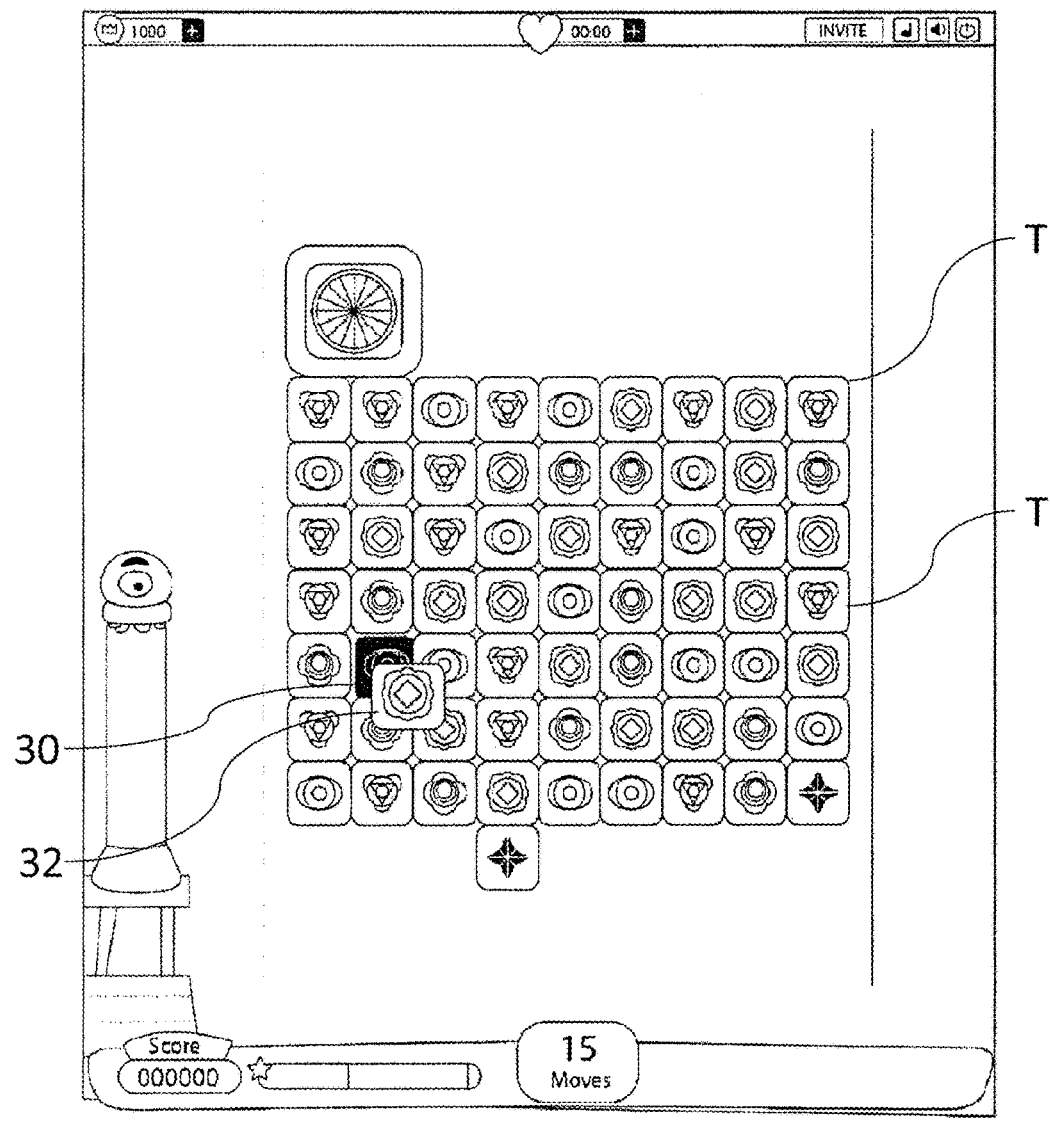
FIG. 3 shows the game board.
Figure 4:
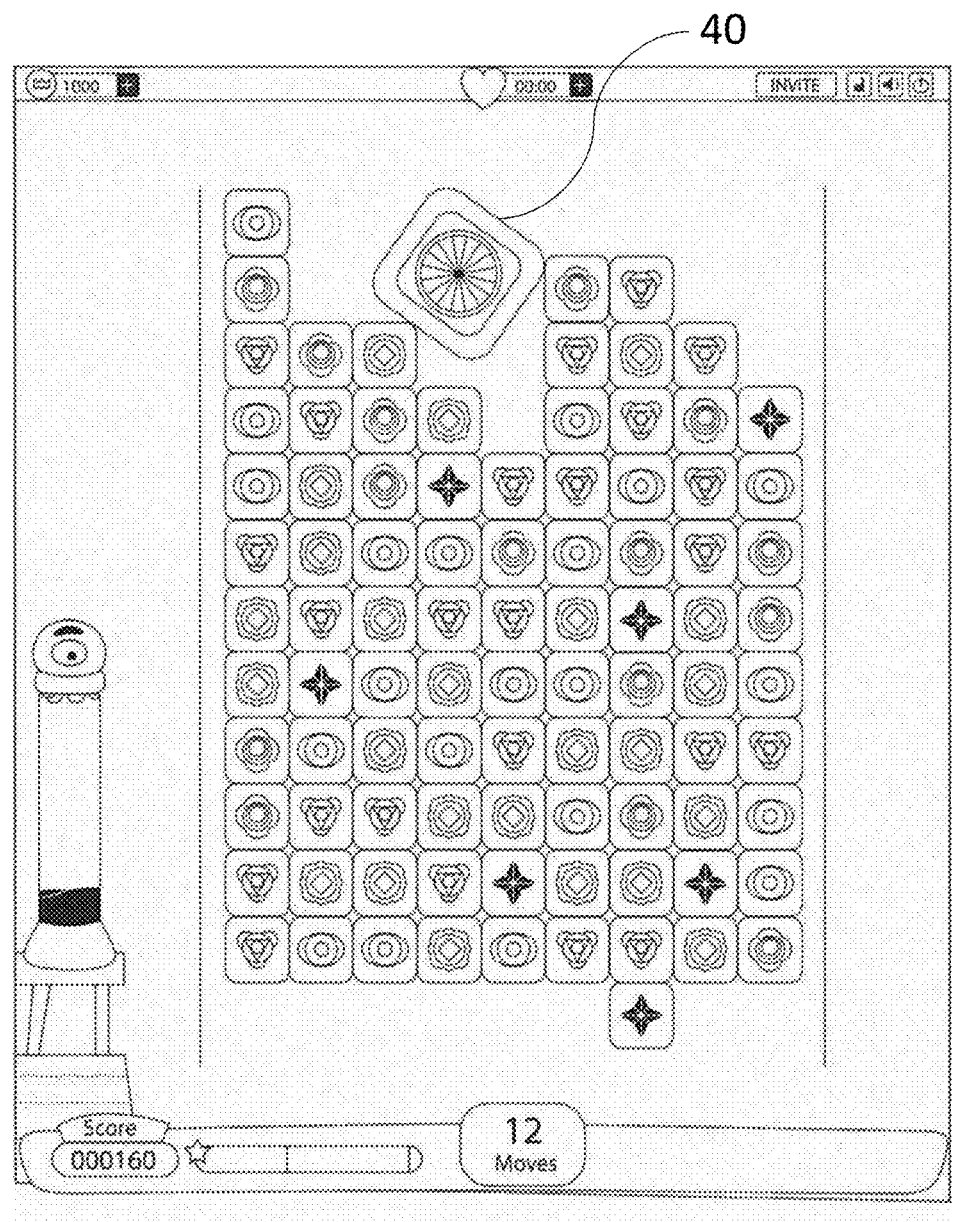
FIG. 4 shows the game board.

An exemplary implementation of the present invention is shown in FIG. 3 and FIG. 4. The game board in FIG. 3 has an array of tiles T in rows and columns. FIG. 3 shows a darkened tile 30 where the player is about to insert another tile 32 in to the game board. The game board may extend further downwards and it may be scrolled down as the player clears away the visible tiles. Tiles are cleared by matching with adjacent tiles, as described later.

In some implementations the tiles may hit the top of the game board as the player is clearing the tiles on the game board but still leaving some, and the board is scrolling. The game may be implemented so that these tiles that hit the top frame of the game board will be removed from the game.

In some implementations the tiles may instead be scrolled upwards so that they are still available on the game board, although they may not be possible to include in a match if they are not visible. As the player clears the game tiles further down the tiles that are hidden at the top may move down and be visible again. To make a match, the player may place a tile next to two other tiles of the same type. Different implementations may have different ways of distinguishing between the different types of tiles; for instance colour, shape or pattern of the game elements. Any match of 3 or more makes the tiles disappear, tiles above those can then fall down into the space and you can get a chain reaction of matching tiles.

While the tiles are falling the player cannot make another match. The chain reaction has to finish before the next tile may be inserted in to the game board.

The player may see the next tile to be placed and in some implementations the player may see more than one tile. There is no refill of tiles. In some implementations the player may be able to swap between the current tile to be placed and one of the next tiles to be placed. This is to make it easier for the player. The feature to allow the player to swap between the next tiles to be placed may in some implementations be a booster feature that the player has to earn or purchase.

In a typical implementation the game is move based and there is a time limit in the game. The antagonist in the game may in some implementations be moves rather than time. This means that the game should end because the player reaches the bottom or the player runs out of moves more often than the player runs out of time.

The tiles/game elements may sometimes form groups of more than 3 game elements and in some implementations this may be rewarded. In one implementation one such reward is for a match of 4 or more game elements to result in a column blast or line blast that will remove a column or line of game elements respectively. These blasts may in some implementations not remove the special 'dream' tiles form the game board.

'Dream Catcher'

As shown in in FIG. 3 and FIG. 4 there is a game element in the form of a larger square object 40 placed on top of the tiles on the game board. This game element has physical properties and may 'tumble' down as the tiles under it are removed. FIG. 4 shows how the game element has moved downwards when some of the tiles under it had been removed.

Figure 5:
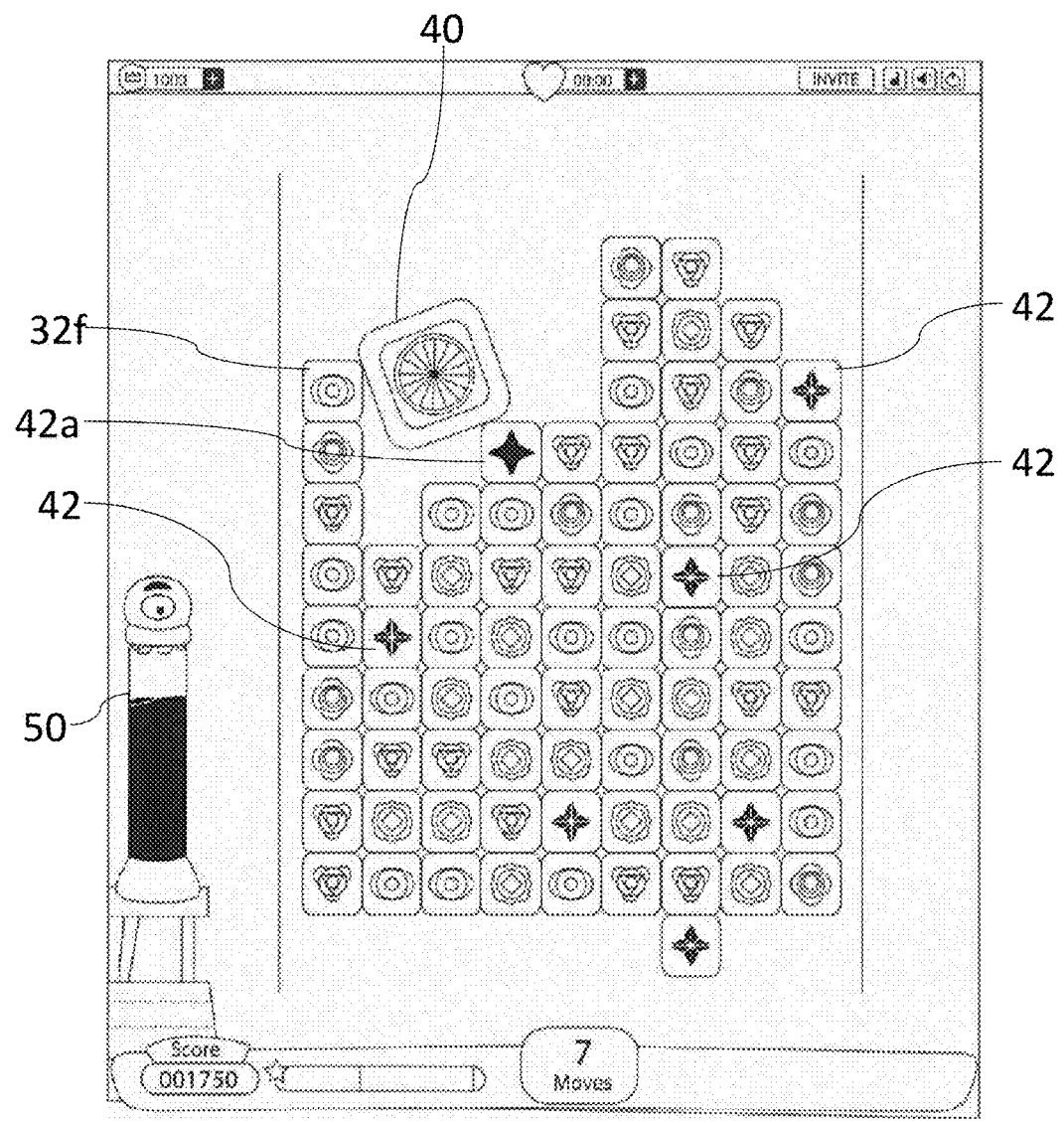
FIG. 5 shows the 'octopus meter' half full.

In one implementation the larger game element 40 is referred to as a 'Dream-catcher' block. The Dream-Catcher block tumbles down when tiles are removed. Among the tiles there are special tiles, 'Dreams' 42. The goal of the game is to get the Dream-Catcher to touch as many Dream tiles as possible and thereby 'catch' them. The dream tiles 42 are shown in FIG. 5 as tiles with a cross or star in the middle. The game element 40 has "caught" the Dream tile 42*a*.

The 'dream catcher' block 40 may in a typical implementation be controlled with a physics engine and the properties decided so that it moves on the game board and has a force downwards. Should the block be stuck or not be able to move the player may in some implementations manipulate the block by clicking on it. The click is then interpreted as a force being applied to the block and it will move accordingly. Clicking on the right side causes the stack to tumble/rotate to the left, while clicking on the left causes it to tumble/rotate to the right. In some implementations each such click may use up one move in the game.

The Dreams 42 "contains" bonus points and extra moves. A not-merged-Dream may in a typical implementation be worth 1 extra move and 2500 points.

The game may be implemented so that the player needs to catch Dreams in order to reach the bottom or else run out of moves. The player may receive extra moves when catching dreams and the player may also create extra moves and points if the player gets Dreams to merge. Dreams are merged by getting them next to each other. Two tiles next to or on top of each other will merge.

When two Dreams merge the new merged Dream will contain all points and moves from both tiles plus one extra move and 2500 p. Merged dream tiles may take a different form so that the player can distinguish them from other tiles.

Reward for merging: 1 extra move and 2500 points. The reward may always be the same indecent of the value of the Dreams that merges.

'Octopus Meter'

Figure 6:
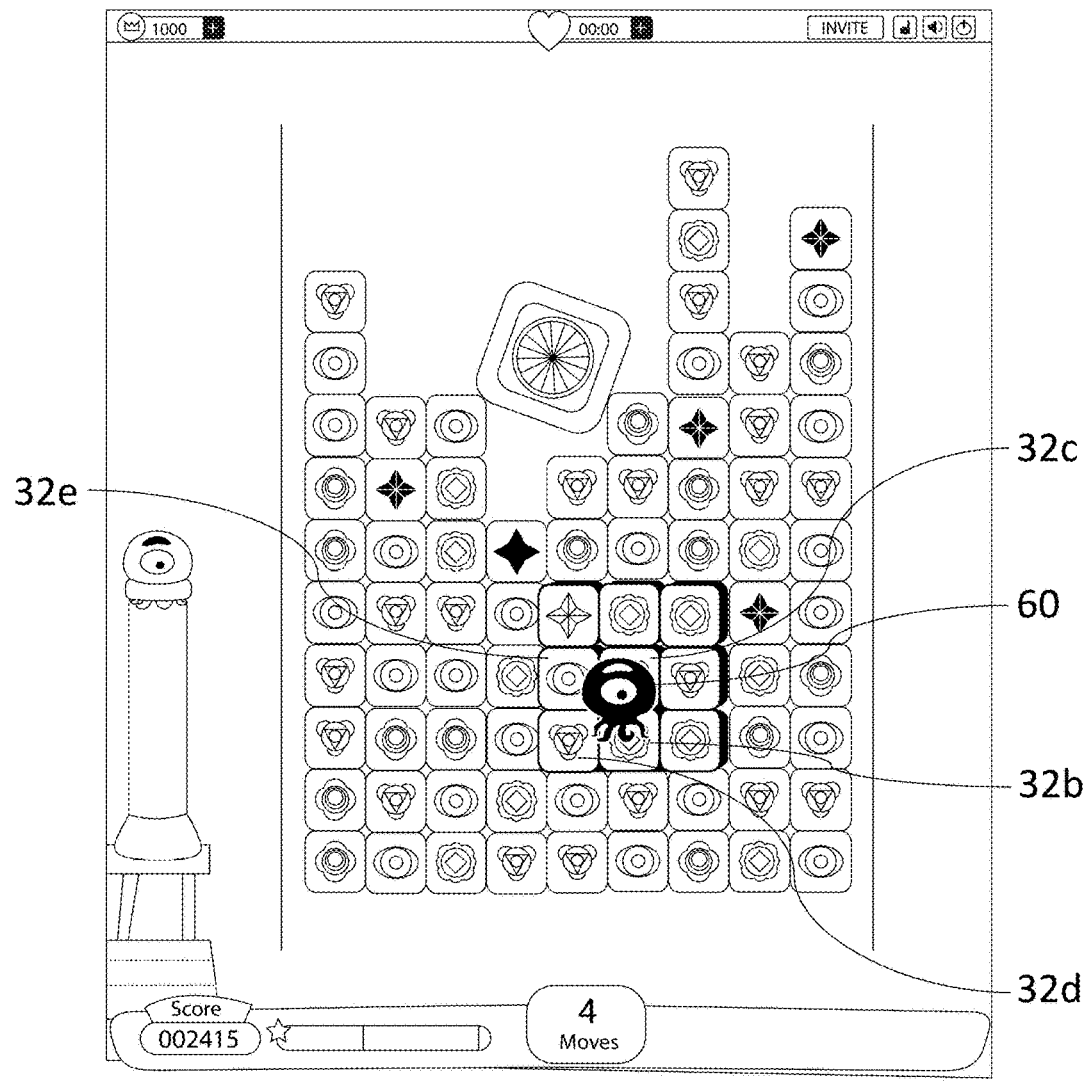
FIG. 6 shows the 'octopus' being used.

The game may be implemented with an element that is awarded to player for good 20 gameplay. One such implementation is shown in FIG. 5 and FIG. 6 where the player is awarded with 'Octavio' which is a game element that can remove a square and leave a dream tile. This game element is built up with the matches the player makes on the game board. A typical implementation is described below.

FIG. 5 shows the octopus meter half full. FIG. 6 shows the octopus being used.

The meter has a value from 0 to 100. When the meter is full you get rewarded with an Octavio 60. The meter fills by making combos/matches on the game board.

The meter fills up according to this a formula which may differ depending on the level in the game or for instance the gameplay. An exemplary formula is "number of tiles in combo x number of tiles in combo/8". Ex: For a group of 4 tiles that is removed the meter will rise with 4×4/8=2.

The meter may also be filled when creating a line blast. For each created line blast the value of the meter is increased with 10.

An 'Octavio' 60 will appear when Octopus-meter is full. An 'Octavio' is a game object that can be inserted like a normal tile, but has different properties. The player places the Octavio like a normal tile over a group of tiles, e.g. 32b-32e, etc. and a Dream tile 42 will be created on one of these tiles. Octavio will also merge any dreams on the adjacent tiles to where Octavio was placed. It is not possible to place Octavio on a Dream tile.

Figure 7:
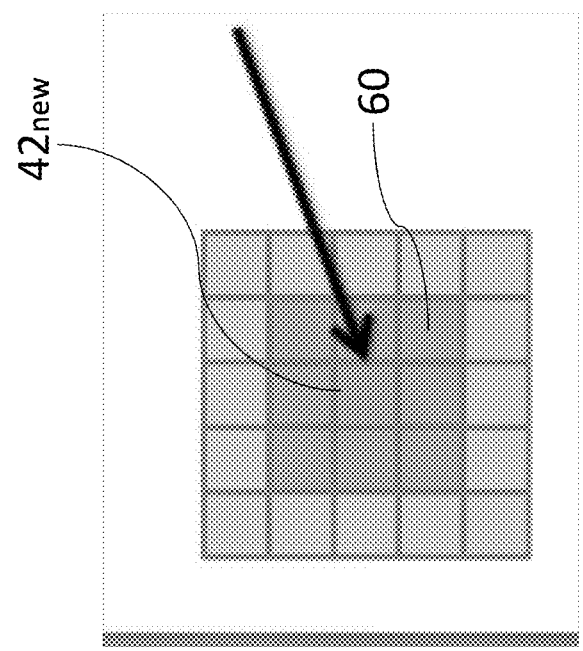
FIG. 7 shows a special game element/booster (Octavio) being used.

FIG. 7 shows a special element/booster (Octavio) being used.

If Octavio (shown as a shaded square of 3×3 tiles) is placed on the game board a new Dream 42 new will appear on the middle tile. Any Dream within a square around the middle tile will merge into the newly created Dream. If one or more Dream on an orange square merges with the newly created Dream you get the merging bonus: 1 extra move and 2500 points. An example is shown in FIG. 7.

Figure 23:
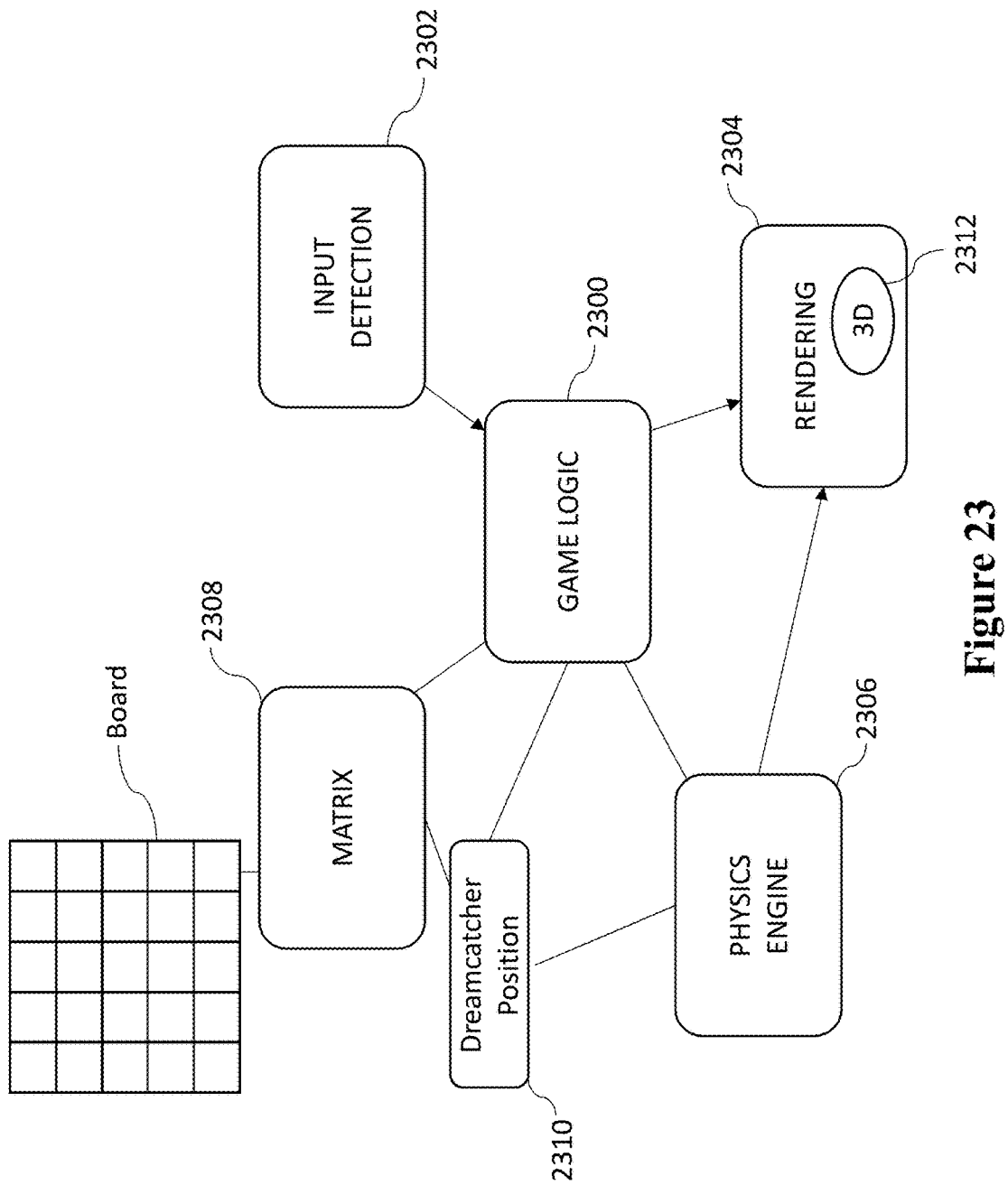
FIG. 23 is a schematic diagram of components implementing the game.

FIG. 23 is a schematic diagram showing components of software used to implement the game. The game comprises a game logic component 2300 which incorporates the rules, etc. of the game. An input detection component 2302 detects user inputs by the input devices 170, to detect where a user is clicking and what action a user has just taken. A rendering component 2304 is responsible for rendering each screen after a user move. A physics engine 2306 is responsible for controlling physics of the dream capture object 40 as will be described in more detail. A matrix component 2308 stores a matrix representation of the game board as shown schematically in FIG. 23. It will be appreciated that in fact the matrix information is held in any suitable data structure, and identifies for each tile location on the board what tile is currently located at that tile location. The matrix representation of the game board can be held in the RAM 174 or any suitable memory.

The dream catcher object 40 is managed by the game logic 2300 as though it is a two-dimensional object having a substantially square footprint on the board. The physics engine simplifies a 3D cube as a 2D form, a square which is described by the front face of the cube. Its position is recorded at any one time by a dream catcher positioning object 2310 which communicates with the game logic 2300 and the matrix 2308. By capturing the position of the dream capture object on the game board, it can be associated with the information about tiles recorded by the matrix component 2308 to determine which tiles it is in contact with. For example, referring to FIG. 6, the object 40 would be recorded as having its left hand edge associated with tile 32f and its lower edge associated with the dream tile 42a. The position of the dream capture object and the tile information are stored at suitable memory locations, e.g. in the RAM 174.

Figure 24A:
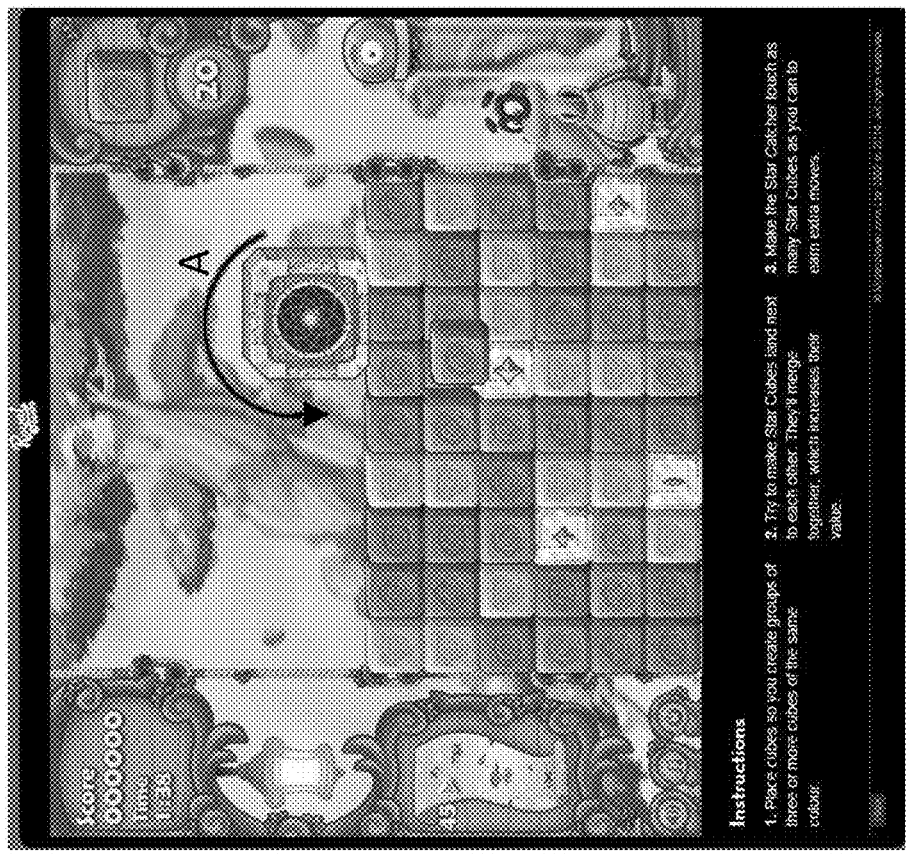
FIG. 24A shows the game board.
Figure 24B:
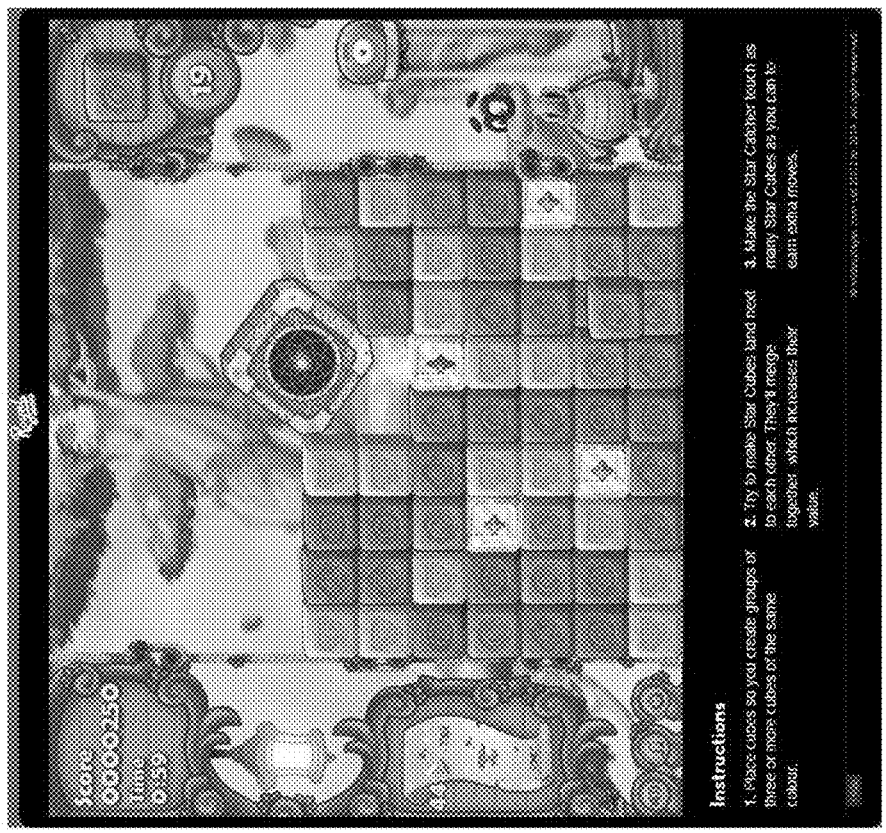
FIG. 24B shows the game board.

The physics engine 2306 controls the physics of the object 40 by simulating a gravitational force on the object which causes it to move downwards assuming that there is no intervening tile blocking it. FIG. 24A shows the object having its lower edge completely blocked by a row of tiles. Three of the tiles form a match and are therefore removed. The match is detected by the game logic based on the information about tiles held in the matrix component 2308. The game logic understands that a match 3 has been made, and that the tiles are to be removed. An instruction is sent to the rendering component 2304 to illustrate removal of these tiles. At the same time, the physics engine controls the object 40 to tumble in a direction indicated by arrow A to adopt the new position shown in FIG. 24B, where it is now blocked at its lower left hand corner and upper left hand corner by respective different tiles. The location in FIG. 24B is somewhat akin to the orientation shown in FIG. 5. Note that the simulated physics applied by the physics engine 2306 is dependent on the position of the dream catcher object 40 and the information stored by the matrix component 2308 to take into account the location of the object with respect to surrounding tiles. Thus, the physics engine determines the angle of rotation based on the size of the object, any interacting tiles which may interfere with it, and the predetermined physics of the object. The speed of rotation is also controlled by the physics engine. Each time a user interacts with the game through the input detection component 2302, that frame of the game is input to the physics engine 2306. The physics engine 2306 requests the position of the dream catcher object 40 from dream catcher position component 2310 and then instructs the rendering engine 2304 to update the display based on the action of the dream catcher object which is to be simulated based on the physics. The physics properties include such things as the friction coefficient, the shape, the reaction coefficient (to determine how the object will behave when it impacts another tile), etc.

Note that the physics engine 236 effectively creates a square object to exist in the physical world, and does not allow the object to "penetrate" adjacent tiles. The physics engine controls the fall of the object based on the presence of tiles as understood by the position information in the matrix component 2308. Thus, the tiles themselves also form part of the physical world.

When the matrix component 2308 detects matches, it updates the physical world and causes the rendering component 2304 (via the game logic 2300) to cause the matching tiles to be removed and to illustrate the tumbling of the dream catcher object.

The matrix component 2308 also understands the nature of tiles on the board, and thereby identifies when a tile is a dream tile. When the dream catcher position is determined to be in contact with a dream tile, the game logic 2300 updates the scoreboard accordingly as described earlier.

One particular challenge is how to render the falling object in a realistic manner. This is achieved by a 3D engine 2312 in the rendering component 2304 which renders the cube on the display as a 3-dimensional object. Thus, it can be shown as a 3-dimensional form so that it can be shown spinning, etc. Nevertheless, it is treated (as described earlier) as a two-dimensional object in the gameplay logic. This allows a realistic rendering while allowing the game to be implemented without undue complexity as far as the game mechanics are concerned.

Figure 25:
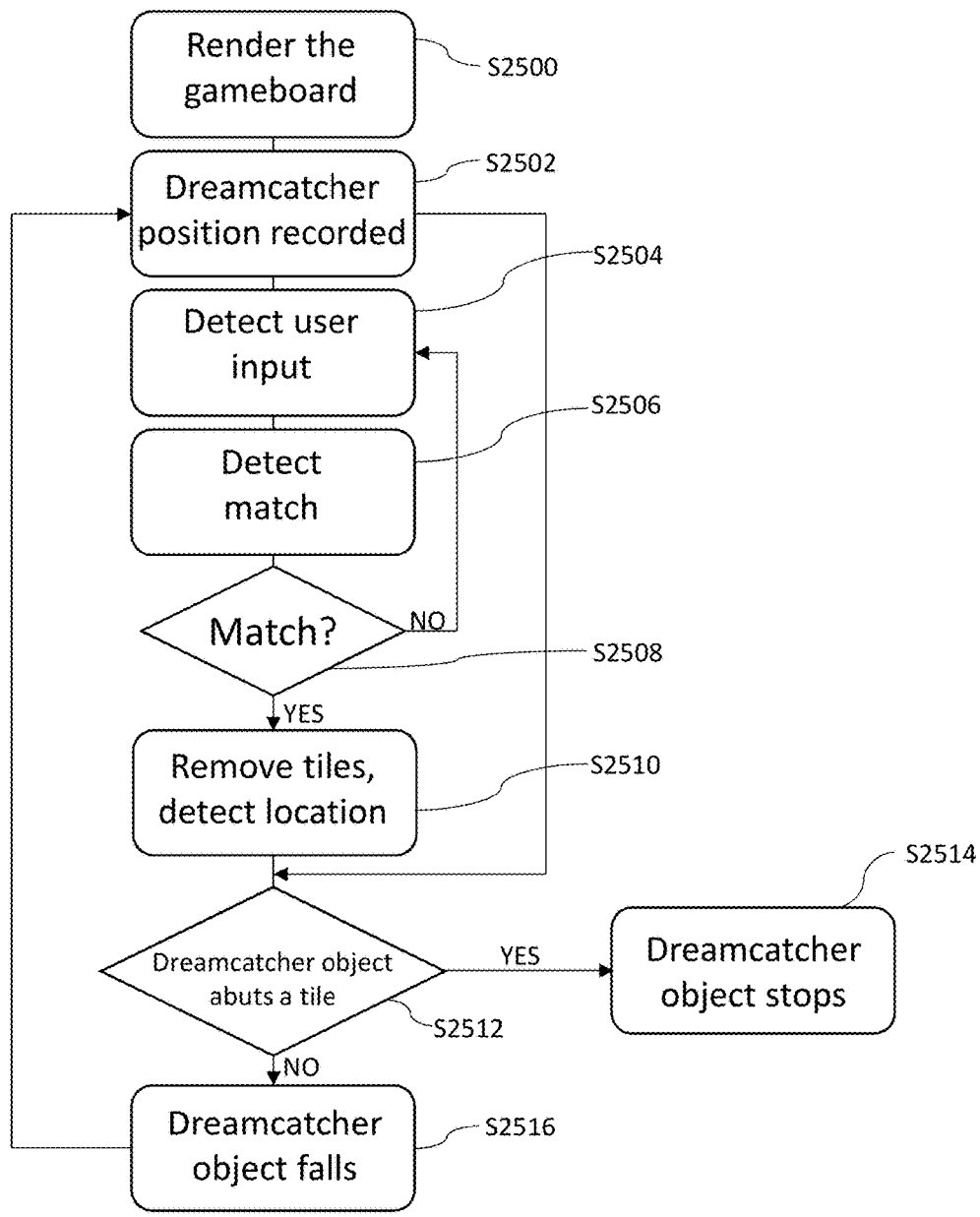
FIG. 25 is a flow chart of a method in accordance with an embodiment of the invention.

FIG. 25 is a flow chart of a method in accordance with an embodiment of the invention. In Step 2500, the game board is rendered. At Step S2502, the position of the dream catcher object 40 is recorded. At this point, the object is treated as a two-dimensional object defined by its front face. Its position can therefore be recorded by coordinates pertaining to its centre for example, or a bottom right hand corner. The position is recorded in a memory.

At Step S2504, a user input is detected to insert at least one new tile at a tile location. At Step S2506, it is detected whether the new tile creates a match with at least two adjacent existing tiles, and if so, a new image of the game board is rendered on the display where the new and at least two existing tiles are removed. These tiles are not replaced, instead the location of the removed tiles is detected to determine if at least one tile abutting the dream catcher object has been removed. If the dream catcher object no longer abuts a tile, it is allowed to fall down the display S2516 under a simulated gravity imposed by the physics engine. The position of the dream catcher is monitored (as in Step S2502), and in this case the result of the monitoring is fed back to the decision point S2512 where it is determined whether the dream catcher object abuts the tile. In this case, if it does, the dream catcher object is prevented from falling further S2514.

Rules

The game is played for 4 minutes and the player has a limited number of moves for instance 7. You can't replace a tile of a specific colour with another tile of the same colour. It is not possible to place Octavio on a Dream. If you make a straight 5-combo the whole row/column will be removed in a line/column blast. If there are any dreams on this row/column each of these dreams increase their value/moves +1.

The game can end in one of the following ways: Run out of time, Run out of moves or that the player reaches the bottom of the game board.

You get extra moves and value for merging Dreams; Bonus for merging Dreams: 1 25 extra move and 2500 p. This is the same independently of the value of the merging dreams.

Scoring
   Standard Match base score:
   3 blocks: 90 points
   4 blocks: 160 points
   5 blocks: 250 points
   Then continue by (Number of blocks)$^2$ ×10
   Sequential matches:
      The score multiplies by ×/2 the number in sequence. So the 3rd match get 1.5× base score.
   Start value for a Dream
      2.500 p
      1 move
   When the game is over you get points for each collected dream
   If you manage to reach the bottom you also get bonus:
      Reach Bottom Bonus=(value of all collected Dream× 0.25)
      Remaining Moves bonus=You get 1000 p/reaming move Exemplary Tutorial for one Implementation
   Tutorial should explain:
   How to place tiles
   How to and the value of merging tiles
   How to collect tiles with treasure
   Suggested text:
   1. "Match three or more bricks of same colour to remove them"
   2. "Try to get Dream-tiles next to each other to merge and thereby making them more valuable"
   3. "Collects Dream-tiles to earn extra moves. You will need them!"
   Suggested anim/picture
   4. Shows a tile being placed and a combo is created, tiles are removed
   5. Shows how two dreams merges together. Should be two dream next to each other.
      Should show that the value/moves of the dreams increases (pop-up?)
   6. Shows how the treasure tumbles down, touching a dream and the dream is collected.
      Should also show that the dream contains extra moves (pop-up) that player earns by collecting the dream Community Features in one Implementation
   Achievement
      For instance collect a star
   Diploma hunts
      1. Merge two Star Cubes
      2. Create an Octavio
      3. Make a line/column blast
      4. Make a combo that creates 4 or more sequential combos
      5. Collect a Star that contains 8 or more moves
      6. Merge 2 or more Stars that contains 4 or more moves
      7. Merge two Stars or more using Octavio
      8. Merge 3 or more Stars at once
      9. Make a combo that contains 7 or more tiles
   Open Game version
      Play until half board is reached Boosters
   The game may be implemented with boosters that the player may acquire in order to enhance the gameplay. Boosters may include
   Start with extra time
   Start with 2 extra moves
   Start with an Octavio
   Octopus meter goes to 90 instead of 100
   Line/column blast
   Move the 'dream catcher'

Social Aspect
Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the players progress. The avatars can also be shown in relation to indicators of the players skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-based

One way of implementing a game using the techniques described herein is through a web site with a plurality of casual games. This platform can be used as a basis to test the performance of the game and how it is perceived by players.

In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 8:
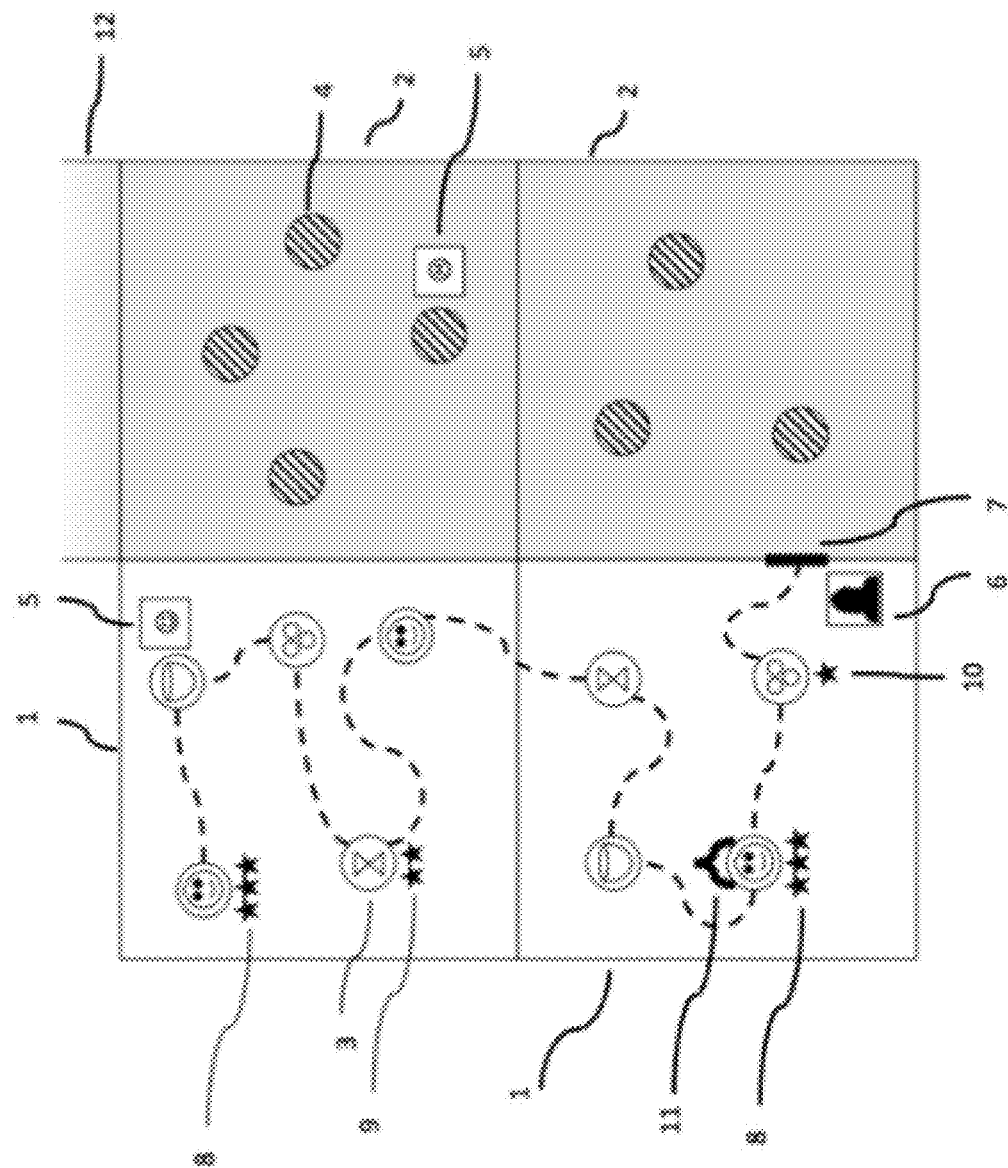
FIG. 8 shows the virtual map.

The game can be implemented so that a player progresses through multiple levels of changing and typically increasing difficulty. FIG. 8 shows an implementation of the game with a virtual map layout of a game environment, displayed on the screen of the computing device used by the game player. As the player progresses through the levels 10 in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when travelling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be new players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 8, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 8 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The users avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9,10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the players friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 9:
FIG. 9 shows animated sequences on a virtual map 1.
Figure 10:
FIG. 10 shows animated sequences on a virtual map 2.
Figure 11:
FIG. 11 shows animated sequences 5 on a virtual map 3.
Figure 12:
FIG. 12 shows animated sequences on a virtual map 4.
Figure 13:
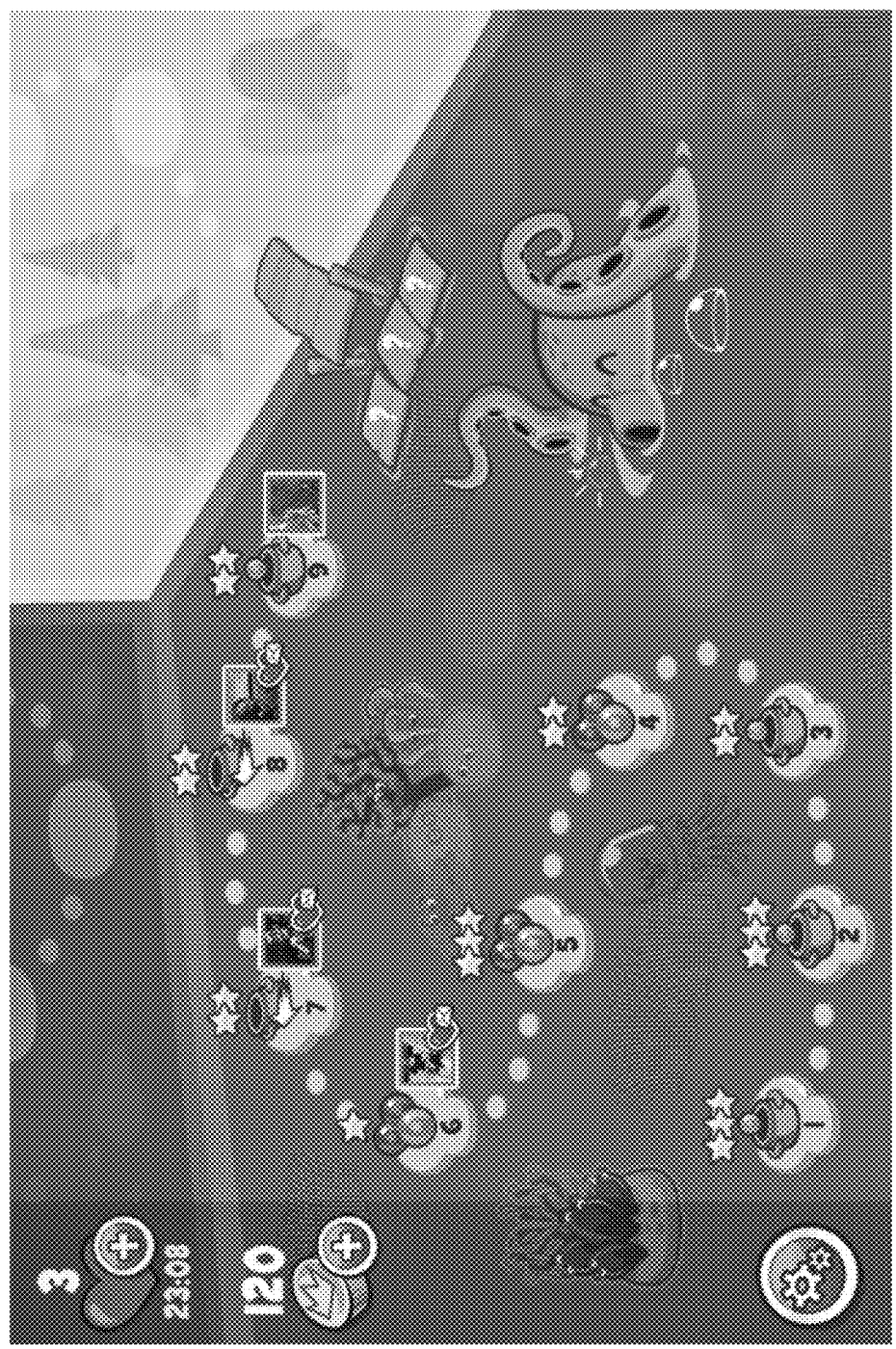
FIG. 13 shows animated sequences 5 on a virtual map 5.
Figure 14:
FIG. 14 shows animated sequences on a virtual map 6.
Figure 15:
FIG. 15 shows animated sequences 5 on a virtual map 7.
Figure 16:
FIG. 16 shows animated sequences on a virtual map 8.

One example of how the virtual map can be dynamic and moving is shown in FIG. 9 to FIG. 16. There are only slight differences between each picture, but when played in sequence they will make the map appear moving and alive. For instance, FIG. 9 shows a water bubble in the middle of popping close to the leftmost arm of the octopus, a medium-sized bubble next to the octopus 1 face and a large bubble close to its rightmost arm. FIG. 10, which is the next in the sequence, shows that the bubble close to the right arm is about to pop, and a large bubble close to the left arm as well as once close to the octopus' face. Even though these differences are subtle, when played in sequence these pictures show how a map can be animated.

Pre- and Post-level Screens

Before starting a level, players have to select which level to play from the map view. When selecting a level, the player is shown information about the level, such as the amount of points needed, the available boosters that can be used, the goal of the level and also the high scores of friends who have previously played that level.

Figure 17:
FIG. 17 shows the Pre-level game progression.
Figure 18:
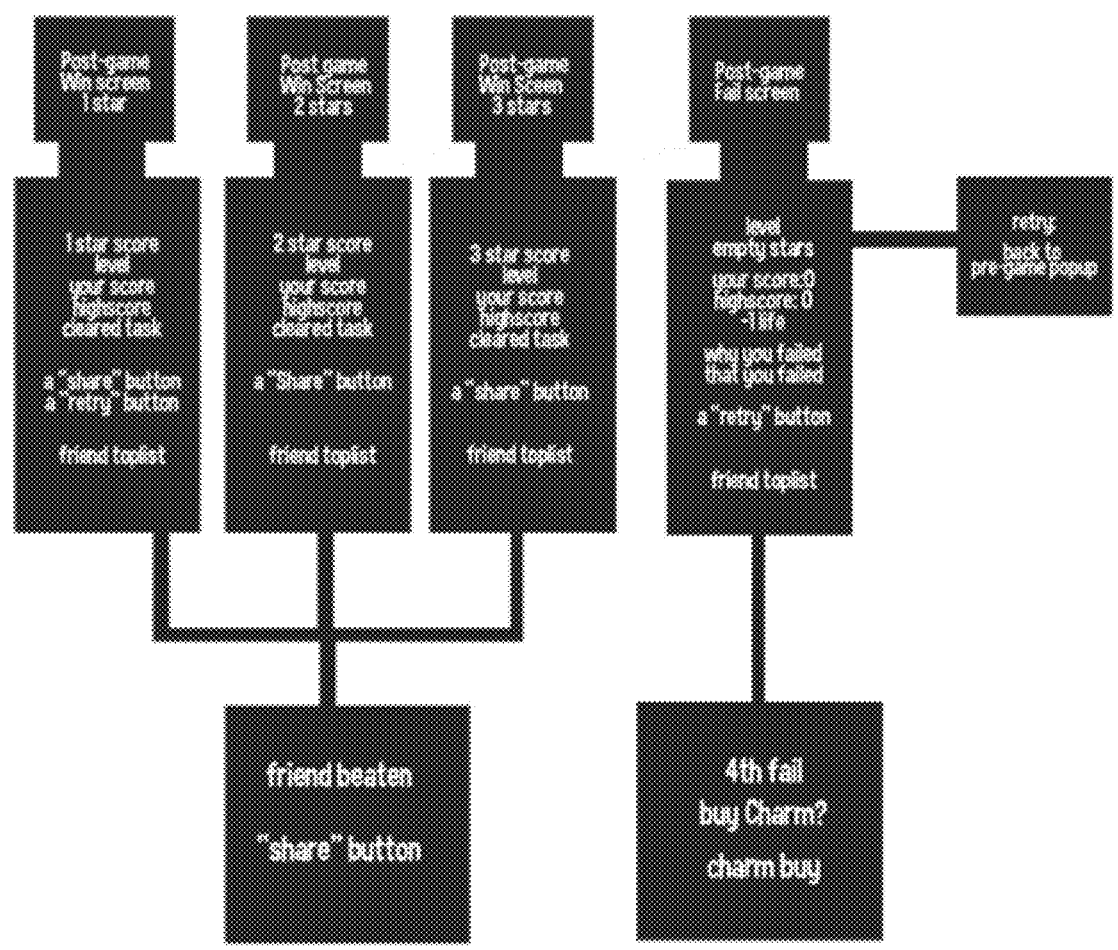
FIG. 18 shows the Post-level game progression.

FIG. 17 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

After completing a level, the player is presented with a screen that shows the amount of points gained, the amount of stars achieved and also the previous high scores of friends. One implementation of the game flow related to the post-level screen is shown in FIG. 1.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' high scores, together with a message about which friend(s) that have been beaten.

High Score List

When showing the pre-level screen, players are presented with the high scores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' High Scores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 19:
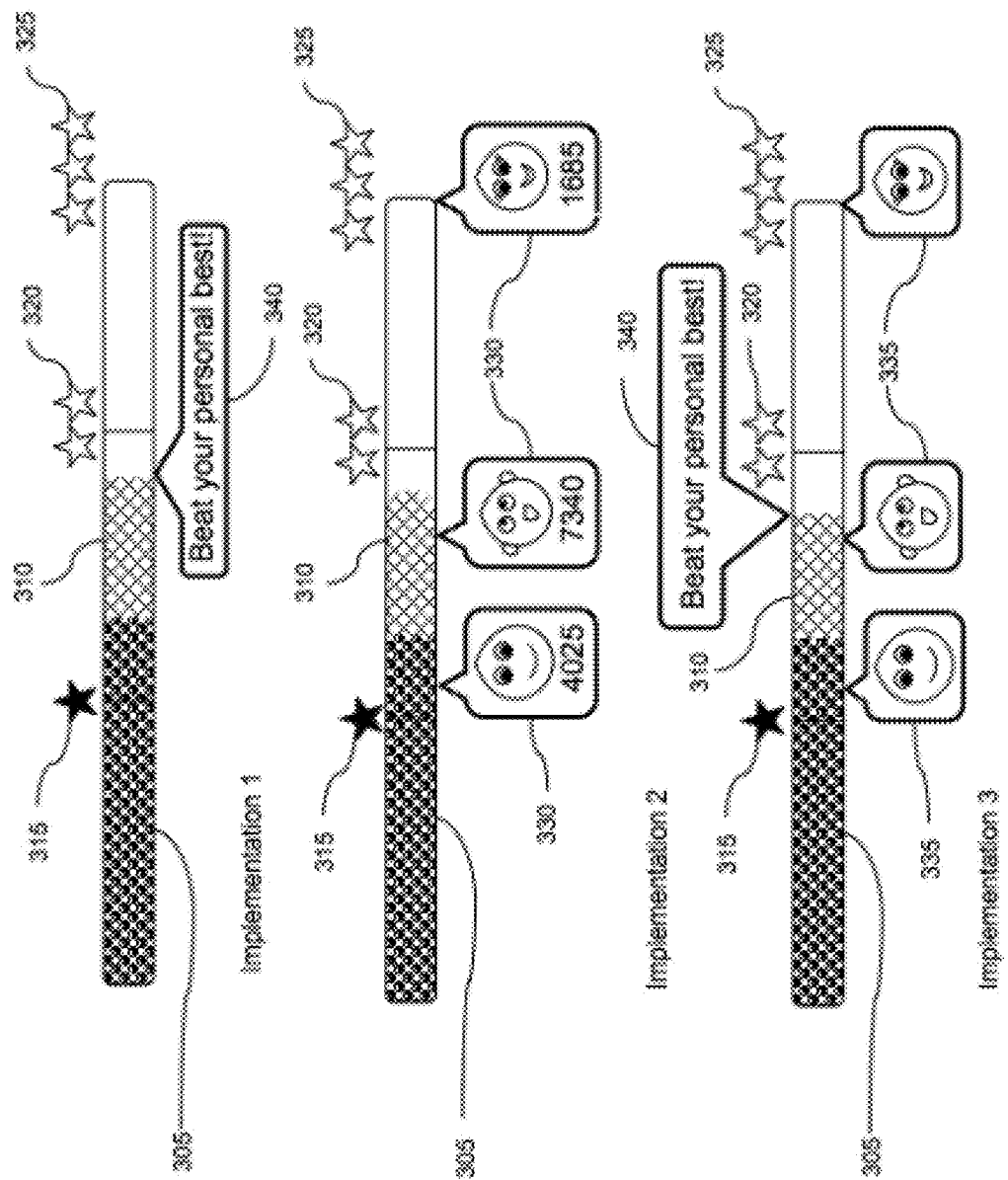
FIG. 19 shows the different ways of implementing a score meter and the results of other players.

In some implementations, the player can see indications of the previous high score achieved on a level while playing it, shown by 310 in FIG. 19. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 19. When the player passes the score of another player or the previous best score the player has achieved, a message can be shown to encourage the player and denote the accomplishment. One example of such a message is illustrated by 340 in FIG. 19.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 20:
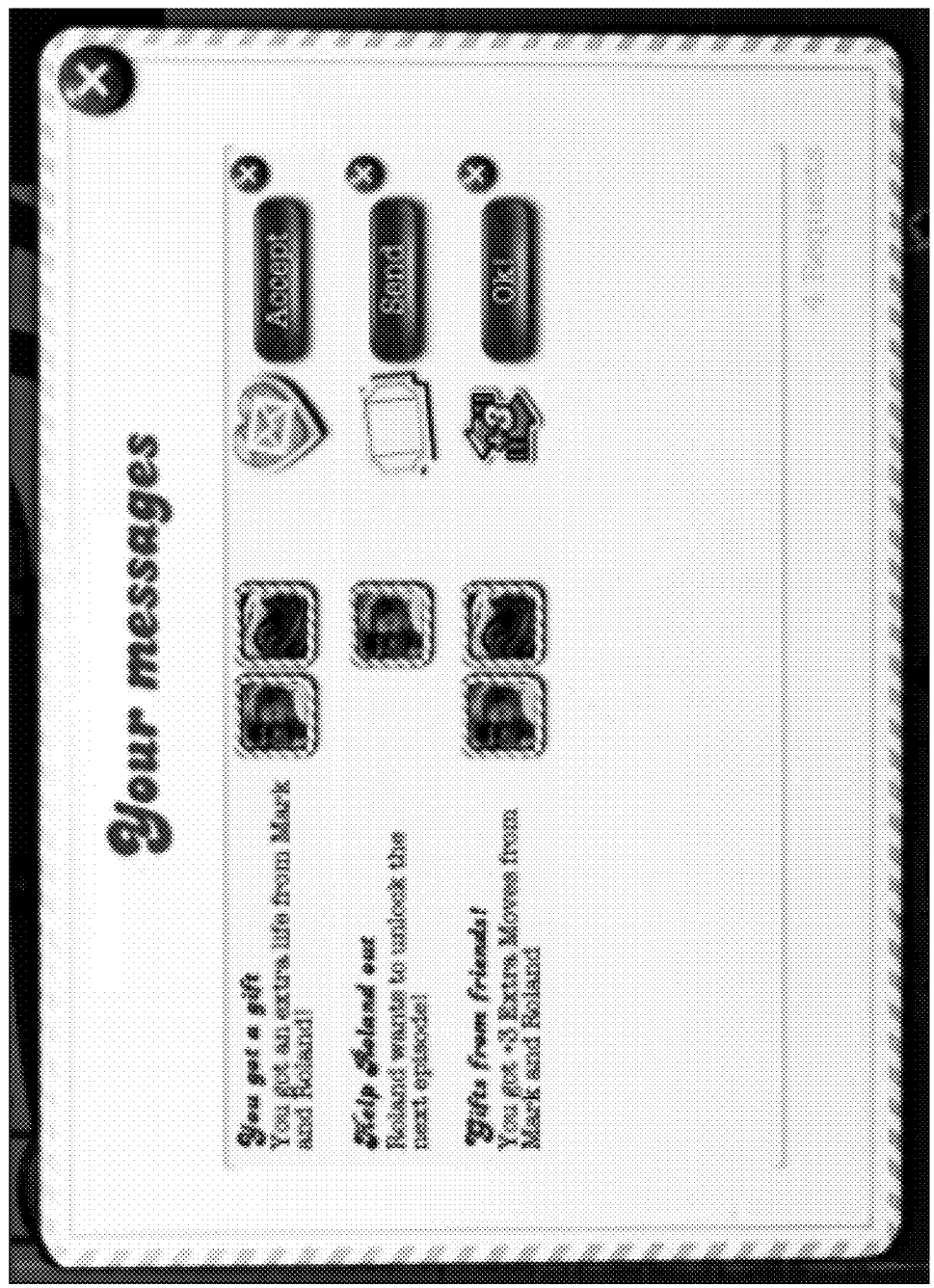
FIG. 20 shows one implementation of how lives and other gifts can be sent and received

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 20 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 21:
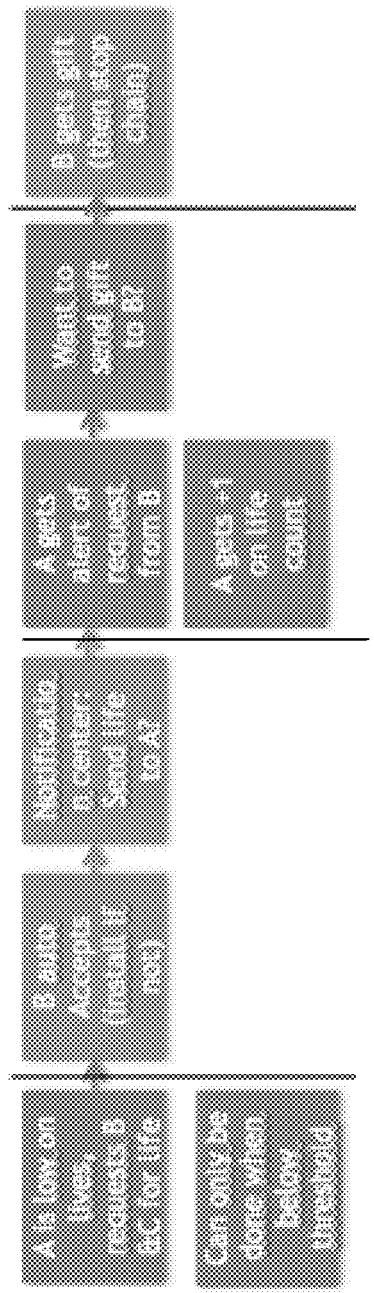
FIG. 21 shows one implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 21.

It is also possible to buy gifts in the in-game shop and send these to friends. Such gifts are in the form of boosters that can be used either during a level or before a level.

Sending Help to Other Players in the Form of for Instance Extra Moves and Extra Time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 22:
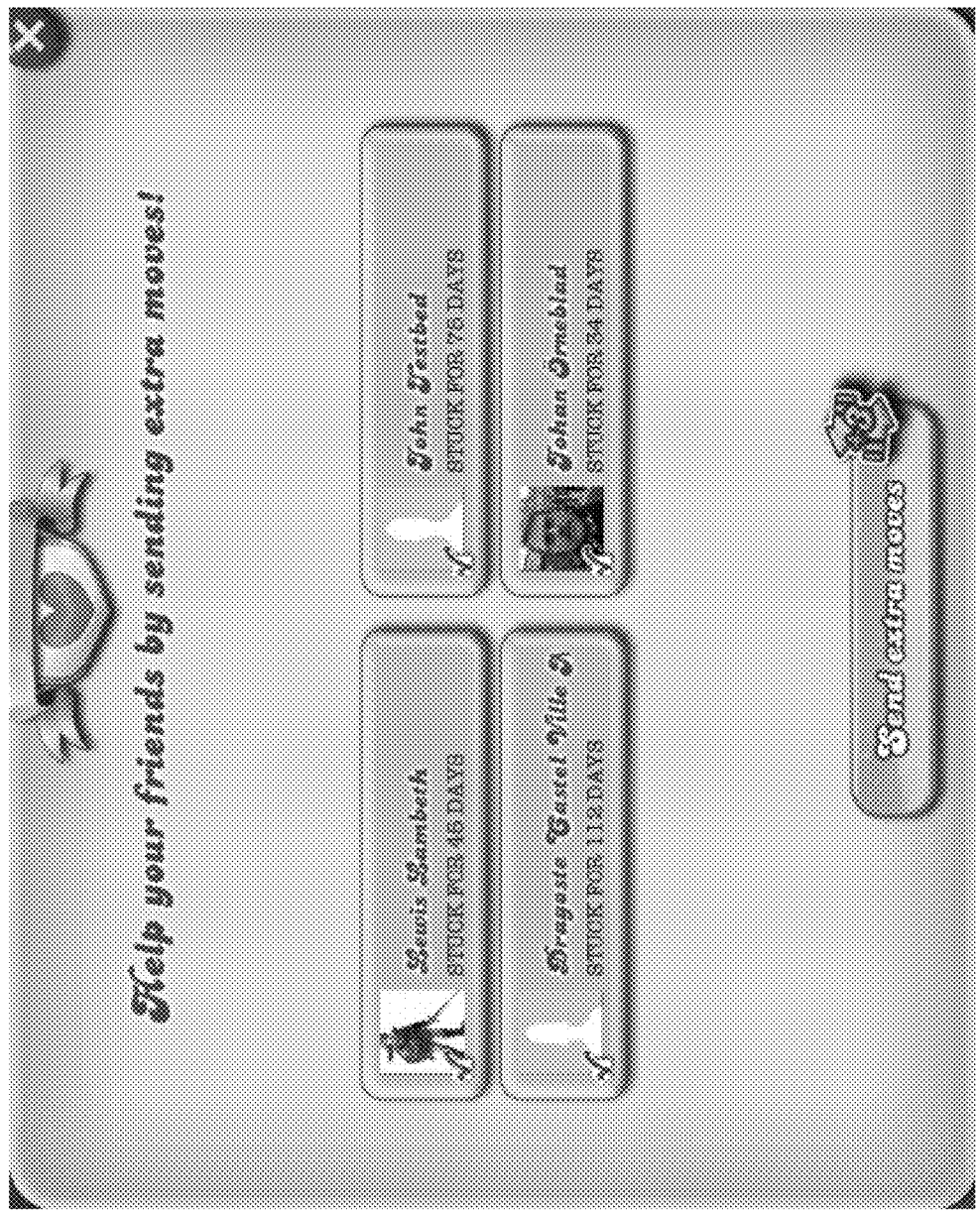
FIG. 22 shows the game prompting the player to help friends that have been stuck for an extended period of time.

The prompting from the game can happen at different points in the game, for instance when a player logs onto the game. Such prompting is illustrated in FIG. 22. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments 5 against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and In-game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-device and Cross-game Functionalities

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The 30 servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be met by a message saying that the game cannot be accessed right at that moment.

The invention claimed is:

1. A method of controlling a display of a computer device comprising:
rendering an image of a game board on the display, the image comprising a plurality of tiles at corresponding tile locations, and a tumbler object abutting at least one tile;
recording in a memory the position of the tumbler object whereby its edges are defined in two dimensions in a physical world;
detecting a user input to insert a new tile on to the game board at a tile location by removing a tile currently located at the tile location from the game board;
detecting if the new tile creates a match with at least two adjacent existing tiles and if so rendering a new image of the game board on the display wherein the new and at least two existing tiles are removed;
detecting in the physical world if the at least one tile abutting the tumbler object has been removed and if so rendering an image of the tumbler object falling down the display under a simulated gravity imposed by a physics engine; and
monitoring the position of the falling tumbler object and on determination that one of its edges abuts another tile, preventing it from falling further.

2. A method according to claim 1, comprising rendering the tumbler object as a three-dimensional object, whereby its image moves in three dimensions, while treating the tumbler object as a two-dimensional object in the physical world.

3. A method according to claim 2, wherein the step of rendering the tumbler object is implemented by a three-dimensional rendering engine.

4. A method according to claim 1, comprising recording the identity of each tile at its tile location in a matrix component, whereby the identity defines the manner in which the tile is presented in the image.

5. A method according to claim 4, wherein a subset of the tiles have a star identity visible on the display.

6. A method according to claim 5, comprising detecting when the tumbler object has an edge abutting a tile with a star identity and causing game logic to apply a game rule based on said detection.

7. A method according to claim 1, comprising detecting a user input in the proximity of an edge of the tumbler object, and rendering an image of the tumbler object falling in a direction of rotation away from the edge at which the user input is detected.

8. A method according to claim 5, comprising detecting in the physical world if at least two tiles with a star identity are adjacent, and in response to the detection causing game logic to apply a game rule to merge the star identity tiles.

9. A computer device comprising:
a display;
a user input component;
at least one processor connected to the display and the user input component and arranged to execute computer instructions to implement the method of:
rendering an image of a game board on the display, the image comprising a plurality of tiles at corresponding tile locations, and a tumbler object abutting at least one tile;
recording in a memory the position of the tumbler object whereby its edges are defined in two dimensions in a physical world;
detecting a user input to insert a new tile on to the game board at a tile location by removing a tile currently located at the tile location from the game board;
detecting if the new tile creates a match with at least two adjacent existing tiles and if so rendering a new image on the display wherein the new and at least two existing tiles are removed;
detecting in the physical world if the at least one tile abutting the tumbler object has been removed and if so rendering an image of the tumbler object falling down the display under a simulated gravity imposed by a physics engine; and
monitoring the position of the falling tumbler object and on determination that one of its edges abuts another tile, preventing it from falling further.

10. A computer device according to claim 9, wherein the computer instructions provide the following components for implementing the method:
a position recording component for recording the position of the tumbler object;
a matrix component for recording the position and identity of tiles at their corresponding tile locations;
a physics engine component;
a game logic component;
an input detection component; and
a rendering component.

11. A computer device according to claim 10, wherein the rendering component comprises a three-dimensional rendering engine for rendering the tumbler object as a three-dimensional object whereby its image moves in three dimensions, while the physics engine is configured to treat the tumbler object as a two-dimensional object in the physical world.

* * * * *